United States Patent [19]
Ehley

[11] Patent Number: 5,737,531
[45] Date of Patent: Apr. 7, 1998

[54] SYSTEM FOR SYNCHRONIZING BY TRANSMITTING CONTROL PACKET TO OMIT BLOCKS FROM TRANSMISSION, AND TRANSMITTING SECOND CONTROL PACKET WHEN THE TIMING DIFFERENCE EXCEEDS SECOND PREDETERMINED THRESHOLD

[75] Inventor: Lynnae Anne Ehley, Delray Beach, Fla.

[73] Assignee: International Business Machines Corporation, Armonk, N.Y.

[21] Appl. No.: 495,162

[22] Filed: Jun. 27, 1995

[51] Int. Cl.$^6$ ................................................ G06F 13/00
[52] U.S. Cl. ........................... 395/200.38; 395/200.61
[58] Field of Search .......................... 395/807, 551, 395/615, 680; 370/503; 364/239, 241.9

[56] References Cited

U.S. PATENT DOCUMENTS

| | | | |
|---|---|---|---|
| 4,663,706 | 5/1987 | Allen et al. | 395/200.13 |
| 4,748,588 | 5/1988 | Norman et al. | 395/551 |
| 4,780,891 | 10/1988 | Guerin et al. | 375/362 |
| 4,901,277 | 2/1990 | Soloway et al. | 395/200.13 |
| 5,195,092 | 3/1993 | Wilson et al. | 348/13 |
| 5,268,846 | 12/1993 | Bonsall et al. | 395/200.61 |
| 5,333,299 | 7/1994 | Koval et al. | 395/550 |
| 5,471,576 | 11/1995 | Yee | 395/154 |

OTHER PUBLICATIONS

Inside OS/2 Software Motion Video, Dr. Dobb's Multimedia Sourcebook, Winter 1994, vol. 18, Issue 14.
Multimedia Systems: An Overview, Borko Furht, IEEE Multimedia, Spring 1994, pp. 47–59.

*Primary Examiner*—Thomas C. Lee
*Assistant Examiner*—Anderson I. Chen
*Attorney, Agent, or Firm*—Mark S. Walker; Andrew J. Dillon

[57] ABSTRACT

Related media streams are transmitted from data sources and received at a data target. A synchronization mechanism is provided for detecting a timing difference between the media streams. If the timing difference exceeds a predetermined threshold, a feedback signal is sent from the data target back to the data source where another mechanism is provided that responds to the feedback signal and causes one of the data sources to alter the transmission of its corresponding media stream to bring the streams back into synchronization.

11 Claims, 13 Drawing Sheets

SYSTEM FOR SYNCHRONIZING BY TRANSMITTING CONTROL PACKET TO OMIT BLOCKS FROM TRANSMISSION, AND TRANSMITTING SECOND CONTROL PACKET WHEN THE TIMING DIFFERENCE EXCEEDS SECOND PREDETERMINED THRESHOLD

FIELD OF THE INVENTION

This invention relates to multimedia systems and, more particularly, to a method and apparatus for synchronizing related multimedia streams.

BACKGROUND OF THE INVENTION

FIG. 1 illustrates the system architecture for a conventional computer system, such as an IBM PS/2® personal computer (PC). The exemplary computer system of FIG. 1 is for illustrative purposes only. Though the description below may refer to terms commonly used in describing particular computer systems, such as an IBM PS/2 PC, the description and concepts equally apply to other systems, including systems having architectures dissimilar to FIG. 1.

The exemplary computer 100 includes a central processing unit (CPU) 102, which may include a conventional microprocessor; a random access memory (RAM) 106 for temporary storage of information and a read only memory (ROM) 104 for permanent storage of information. Other mass storage devices may include a diskette drive and controller 110 for storing and retrieving information from a removable diskette 110a that may be inserted into drive 110 and a disk controller 113 for controlling a fixed hard disk 113A that is included in computer 100. Input/output devices include a serial controller 109 for controlling a serial output port; a keyboard and mouse controller 105 for controlling a keyboard input device 105a and a mouse input device 105b and a video controller 111 for controlling a video output display 111a. Further hardware devices include a memory controller 103 for controlling RAM 106; a DMA controller 107 for performing direct memory access to RAM 106; a bus controller 112 for controlling bus 108; and an interrupt controller 114 for receiving and processing various interrupt signals. Other input and output devices, such as an audio subsystem 116, may be connected to the system through expansion slot 115.

The hardware devices which comprise computer 100 are generally controlled and coordinated by operating system software. Conventional operating systems control and schedule computer processes for execution, perform memory management, and provide file system services, which allow information to be stored and retrieved from the mass storage media. Operating systems commonly provide networking and I/O services and generate and manage various user interfaces, such as a graphical user interface (GUI), and the like. Various commercial operating systems exist which are suitable for use with the present invention, such as the OS/2® operating system, available from the International Business Machines Corporation (IBM), Boca Raton, Fla.

While the operating system provides general capabilities, the computer 100 is generally controlled at any given time by an application program which controls the computer to perform a given task or set of tasks. User application programs may perform tasks, for example, such as text editing and spreadsheet processing. Such application programs generally rely, either directly or indirectly, on the general functions and capabilities provided by the underlying operating system with which the application program interacts.

In recent years, personal computers have been used as multimedia processing systems in order to store, organize, and display, often simultaneously, various forms of data, including textual data, digital audio data, digital video data, and digital music data (e.g., MIDI). The data are stored and organized using a variety of conventional methods and are retrieved and reproduced by a multimedia application program to produce a multimedia "event". During such an event, the reproduction, or "playback," of the various data types must be coordinated by the multimedia application so that the resulting presentation will appear realistic. For example, video data and audio data may be played back to produce a movie video sequence on a display 111a with synchronized audio from audio system 116. In many such presentations, it is of utmost importance that synchronism be maintained between the various components of the presentation. For example, in a synchronized audio and video multimedia event, delays in the playback of the audio data may result in a poor quality, possibly incomprehensible, sound playback that does not match the visual playback in a very noticeable manner.

A multimedia application, i.e., the software that executes on a multimedia system to produce the multimedia event, controls various components of the computer 100, such as video controller 111 and audio subsystem 116, to produce the multimedia event. In order to do this, the multimedia application may request assistance from the operating system to perform certain tasks. For example, although the multimedia application must supply the audio components 116 and the video components 111, 111a with sufficient data, at sufficient data rates, in an appropriate sequence, and at the appropriate time instances to provide a realistic event, the operating system must provide the various device drivers that are needed to communicate the data to the physical I/O devices.

During the production of a typical multimedia event, the multimedia application, possibly with the assistance of the operating system, retrieves the data needed by the application from one or more sources, such as files stored on a disk 113A. For example, audio and video data may be stored in a file on a CD-ROM 117. If a single file is used, the data in the file may be arranged within the file to facilitate playback by the application. For example, the audio and video data may be interleaved. In this case synchronization between the retrieval of the audio and video data can be achieved relatively easily.

On the other hand, the data may be segregated, e.g., audio data being stored in a file of disk 113A and the video data being stored in a file of CD-ROM 117. In such an arrangement, more care must be taken that the data are properly retrieved and coordinated to produce a coherent event, i.e., one in which the audio playback is in synchronism with the video playback.

During the production of a multimedia event, the digitized samples are arranged in sections, called frames, which represent the audio and video information. Frames are retrieved (or "pulled") from a data source to a destination or target in a continuous, sequential fashion typically referred to as a "media stream." Alternatively, the digitized samples may be provided (or "pushed") by the data source to the target in another media stream. "Pulling" refers to a conventional operation in which a target makes explicit requests to the data source for media data. "Pushing" refers to an operation in which the data source sends media data to the target at predetermined time intervals. The operations of pulling and pushing are further described below.

FIG. 2 illustrates an audio stream 201, comprising a sequence of audio frames 201a–201cc, and a video stream 202, comprising a sequence of video frames 202a1–202c1. In this example, two video frames, e.g., 202a1 and 202a2, relate to a single audio frame, in this case frame 201a. Such relationships depend upon the underlying multimedia application and on the manner in which the data are organized and arranged at the data sources. The multimedia application may use a single audio frame to cause the audio system 116 to produce a portion of the audio playback, e.g., human speech. Likewise, the application may use two video frames to, essentially, contemporaneously produce related video playback.

A given media stream preferably has intra-media continuity, i.e., the stream has a sequence of frames which generate the desired sounds when reproduced in order. As a descriptive example only, assume that audio frames 201a, 201b and 201c each encapsulate a sound sequence for a single word and that the audio stream 201 intends to represent the sentence "The dog is black." If the stream is to have intra-media continuity, the first frame 201a should have audio data corresponding to the word "the;" the second frame 201b should have audio data corresponding to the word "dog;" and so on. If the stream is maintained in its proper frame sequence during playback (201a, 201b, 201c, etc.), a meaningful, coherent sentence will be played back. If, however, intra-media continuity is violated, the playback may result in an incoherent sentence, such as "the is dog black", if the frame sequence is disordered (to 201a, 201c, 201b . . . ), or "the dog black", for example, if frame 201c is lost from the stream 201.

Similarly, related streams preferably have "inter-media continuity", i.e., temporal synchronization between related media streams. For example, if an audio stream encapsulates a sound sequence of human speech, followed by the sound sequence of a dog barking and if a video stream encapsulates images of a person's lips moving, followed by images of a dog's mouth moving, well synchronized streams should result in a multimedia event having human speech played back in synchronism to the person's lip movements and not have, for example, the sound of a dog bark when the video image is of the person's lips moving. Thus, video frames 200a1 and 202a2 must be played back together with audio frame 201a in order to produce proper playback.

For a given multimedia application, the intra-media and inter-media continuity of some streams may be more critical than others. Audio streams, for example, are typically more critical than video streams. If intra-media continuity is violated for an audio stream, the sound playback will be distorted and possibly incoherent. The distortion may produce slurred sound or introduce clicks into the sound depending upon the nature of the audio and the gravity of the violation. Such distortion is likely to be perceived by the user.

On the other hand, violation of intra-media continuity of a video stream will distort the video playback, although not appreciably. If, for example, a single video frame is lost and in its place the prior frame is substituted, the distortion will likely be imperceptible to an average viewer. Since most video displays 111a produce video images so quickly—on the order of 30 frames per second—an error for a single frame is difficult for a user to recognize. In addition, a given video frame is usually similar to a prior video frame. Thus, if a prior frame is substituted for a missing frame, the error will be slight because the frames are similar and because the error will only appear for a short time period.

Some systems take advantage of the imperceptibility of a violation of intra-media continuity in video streams by purposefully violating video intra-media continuity to correct the inter-media continuity. Referring to FIG. 3, if a video frame 302b1 is unavailable (due to delay), when a related audio frame 301b is scheduled to be played back at time $t_b$, some applications will replay the previous video frame 302a2 again. As described above, this violation of the video stream intra-media continuity is fairly unlikely to be perceived by a viewer.

At the next scheduled playback time $t_c$, video frames 302b1 and 302b2 have since arrived in addition to video frame 302c1, which corresponds to the next audio frame 301c. If video frames 302b1 and 302b2 were played back in conjunction with audio frame 301c, the video and audio streams would be phase-shifted and remain in a state of inter-media discontinuity.

One conventional synchronization strategy drops (i.e., ignores) video frames 302b1 and 302b2 at the target during reproduction. An application following this strategy would instead use, at time $t_c$, audio frame 301c and video frame 302c1, not either of video frames 302b1 or 302b2. In this manner, the stream inter-media continuity is corrected.

Recently, multimedia systems and applications have been designed to operate over a computer network, having data sources distributed at potentially different network locations or nodes. Such a computer network is an arrangement of computers that communicate according to a predefined protocol, such as TCP/IP, over a communication medium, such as coaxial cable. FIG. 4 illustrates a conventional network arrangement 400. The multimedia application executes on client node 401 (client) and receives an audio stream from audio server node 402 (audio server) and a video stream from a video server node 403 (video server). The data are provided to the client from the servers across network 404, which, as is known in the art, is constructed from conventional cable, routers, hubs, bridges, and/or other communications media.

The use of distributed data sources, such as servers 402 and 403, generally increases the likelihood that the characteristics of streams will vary from stream to stream and also for a given stream over time. Actual arrival times for information in any given stream may vary from the theoretically expected arrival times due to a number of reasons. These reasons may include different delays in accessing files at the different servers 402 and 403, different delays in encoding data (not shown) at the servers 402 and 403 and different delays for decoding data (not shown) at the client 401. Further, certain delays may be introduced into some streams but not others, e.g., a decompression delay may be introduced into video streams (not shown), but not into audio streams. Finally, variations in arrival times can be created by inherent variations caused by the network 404, such as network packet loss, variations in packet buffering in intermediate nodes 405, and different network routing paths 407 and 408 from the servers 402 and 403 to the client 401. The performance characteristics of a network also vary according to many dynamic variables, such as the network congestion or network traffic.

Consequently, when a stream is provided from a distributed source, such as server 403, the source is less likely to provide frames at the exact intervals needed by the multimedia components. The data may arrive in bursts of frames, followed by a period of delayed data, for example.

Referring to FIG. 5, typical media streams are shown which are pulled from distributed sources. These streams are subject to a phenomenon known as "jitter." In particular, the audio frames 501a–c no longer arrive at exact inter-frame intervals of IF seconds. Rather, a time delay D exists between the expected time of arrival $t_b$ and the actual time of arrival $t_{b1}$.

Such time delays D violate intra- and inter-media continuity. Intra-media continuity is violated since a particular frame 501b is not available for playback by the audio subsystem 116 at its expected playback time tb. As such, the application must use a dead or substitute frame for playback. From the perspective of the application, the delayed frame 501b is lost. Inter-media continuity is violated because the related streams am in asynchronism at the scheduled timing point for playback $t_b$. As described below, some conventional systems will not play a dead or substitute audio frame but instead delay the video, until the audio arrives.

To alleviate jitter in distributed source systems, some conventional multimedia processing systems use buffering schemes. In such systems, when frames arrive at the client 401, rather than being played back immediately, they are temporarily stored in buffers. The buffered data are then used by the multimedia system components.

Though data buffering may help alleviate jitter, it is not foolproof. Frames may still become lost or sufficiently delayed to such a degree that buffering is not helpful. In addition, synchronization by dropping frames at the target during reproduction is inefficient because the transmission system, or network, incurs the penalty and cost of transmitting unused frames, which is especially costly for applications distributed over a network. Moreover, transmitting unused frames over a network increases the congestion of the network which, in turn, increases the likelihood of jitter and lost packets. The increased jitter, in turn, increases the likelihood that more frames will need to be dropped in the future, thereby compounding the problem.

In addition, experiments have revealed that methods of synchronizing streams by dropping frames during reproduction sometimes cause several, contiguous frames to be dropped. As described above, when frames are dropped, intra-media and inter-media continuity is violated. The more frames that are dropped, the greater the gravity of the violation and the greater the degradation of the multimedia event.

Accordingly, there is a need in the art for a method and apparatus for synchronizing a media stream, while reducing the likelihood of transmitting an unused frame.

An advantage of the present invention is the ability to synchronize related streams and reduce the likelihood of transmitting unused frames.

A further advantage of the invention is the ability to reduce the likelihood of serious continuity violations.

SUMMARY OF THE INVENTION

The present invention relates to a method and apparatus for synchronizing media streams by using feedback. During playback, the target of a media stream provides information to the source of the stream that indicates whether frames from that source have been dropped and the dropping frequency. In response to this feedback, the media stream source adjusts its transmission in order to minimize the dropping frequency at the target. In effect, the feedback causes the media source to remove some frames at the source so that the source avoids transmitting frames that are not likely to be used at the target. Consequently, frames are distributed more efficiently.

The invention includes a method of and an apparatus for synchronizing a master media stream with a slave media stream. The slave media stream has a plurality of slave media data blocks that are sequentially transmitted from a data source to a data target.

The apparatus includes a mechanism for determining a timing difference between the slave media stream and the master media stream and a mechanism for controlling the data source to alter the transmission of media data blocks when the timing difference exceeds a predetermined threshold.

The method includes the following steps:

a) receiving the slave media stream and the master media stream;

b) determining a timing difference between the slave media stream and the master media stream; and c) controlling the data source to alter the transmission of media data blocks when the timing difference exceeds a predetermined threshold.

BRIEF DESCRIPTION OF THE DRAWING(S)

The above and further advantages of the invention may be better understood by referring to the following description in conjunction with the accompanying drawings in which.

Figure 9A:
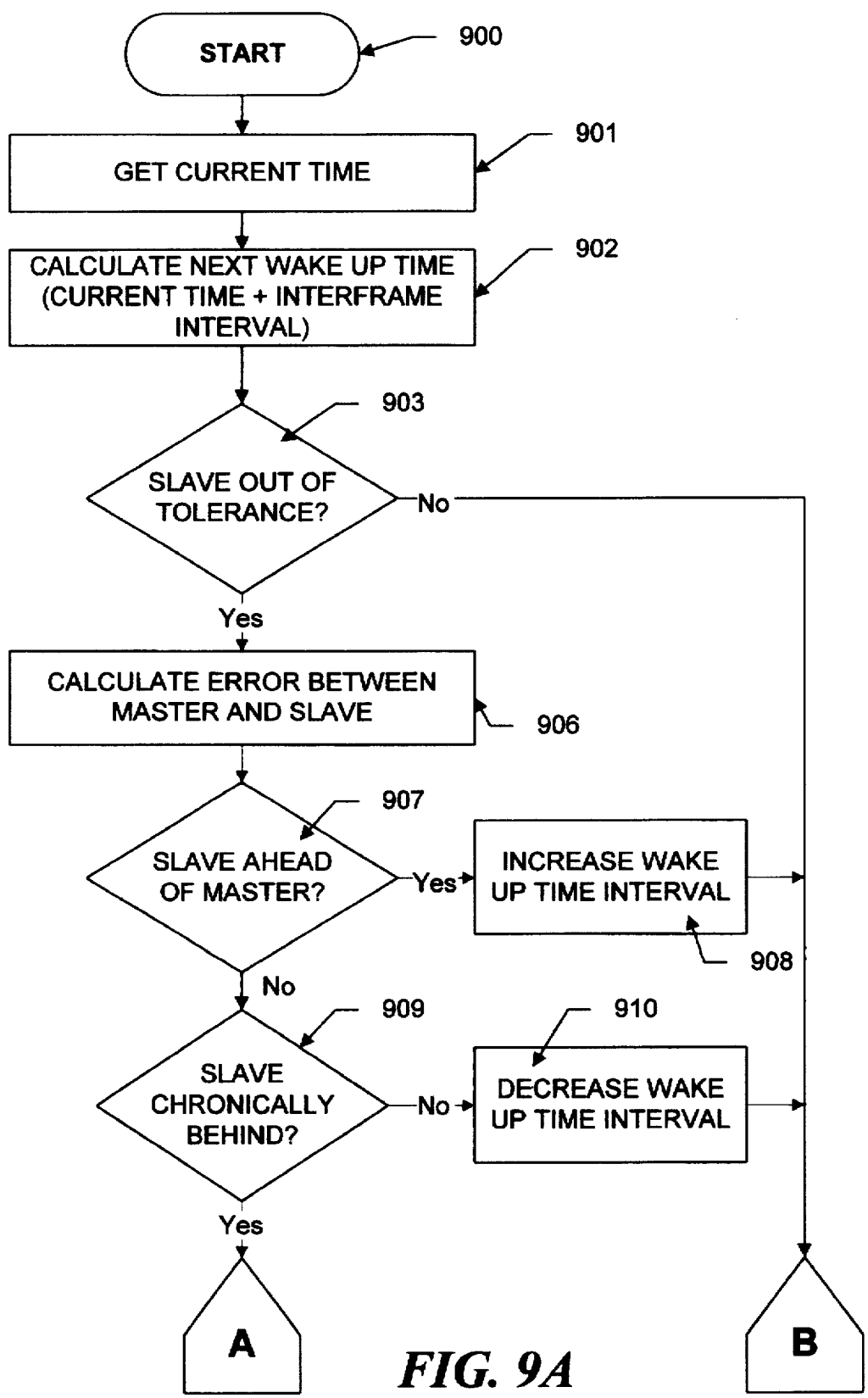
Figure 9B:
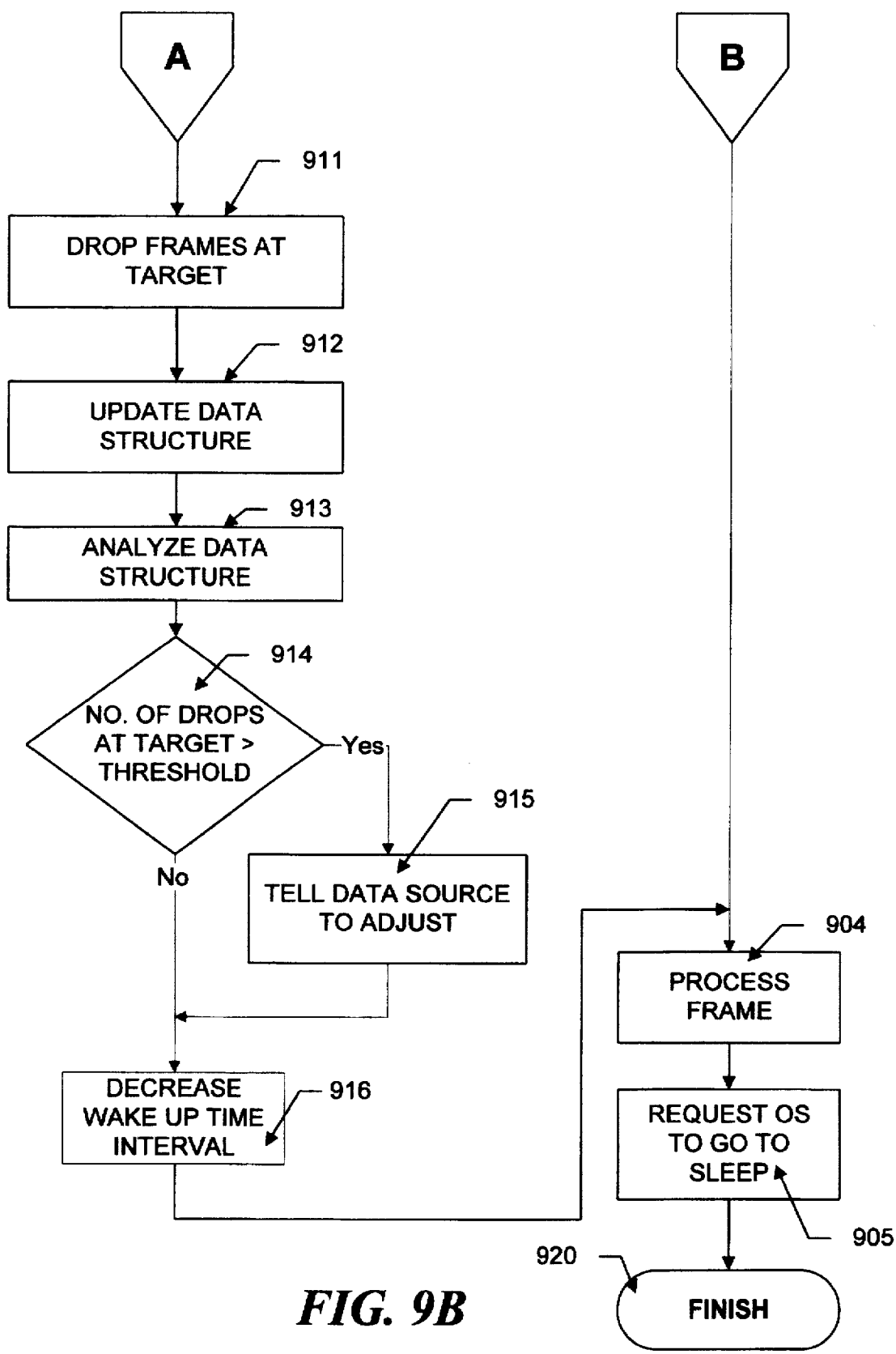
Figure 10:
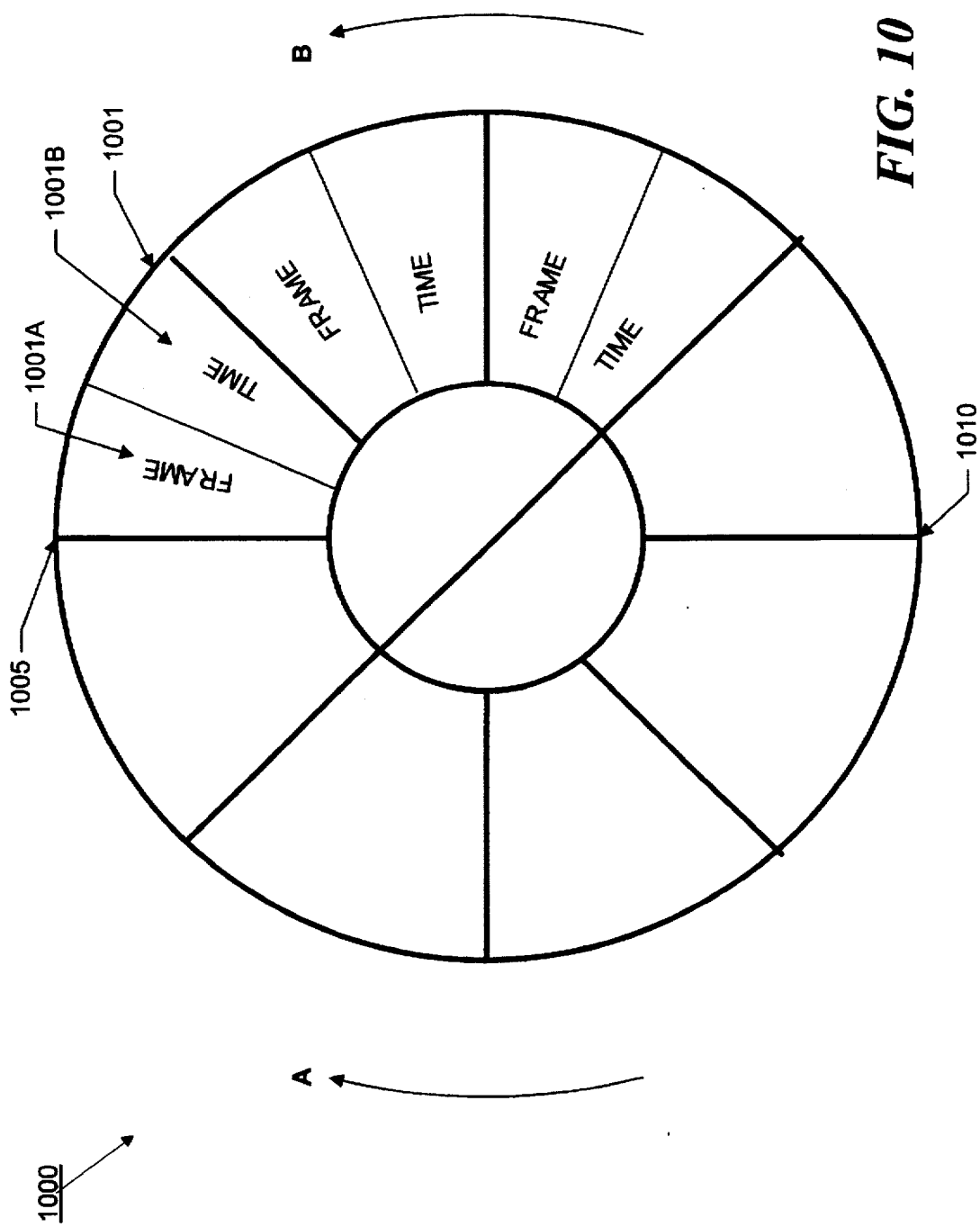
Figure 11A:
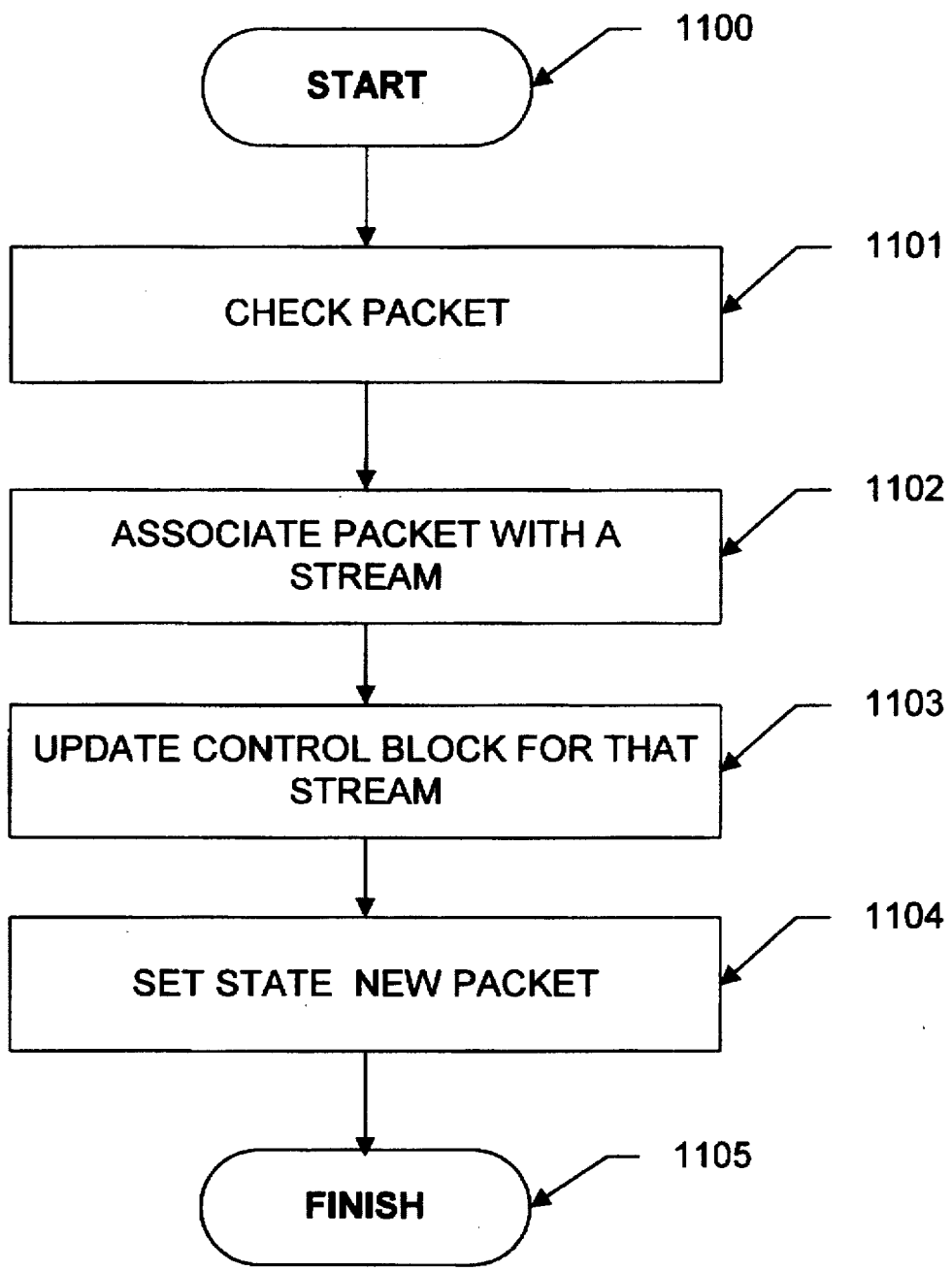
Figure 11B:
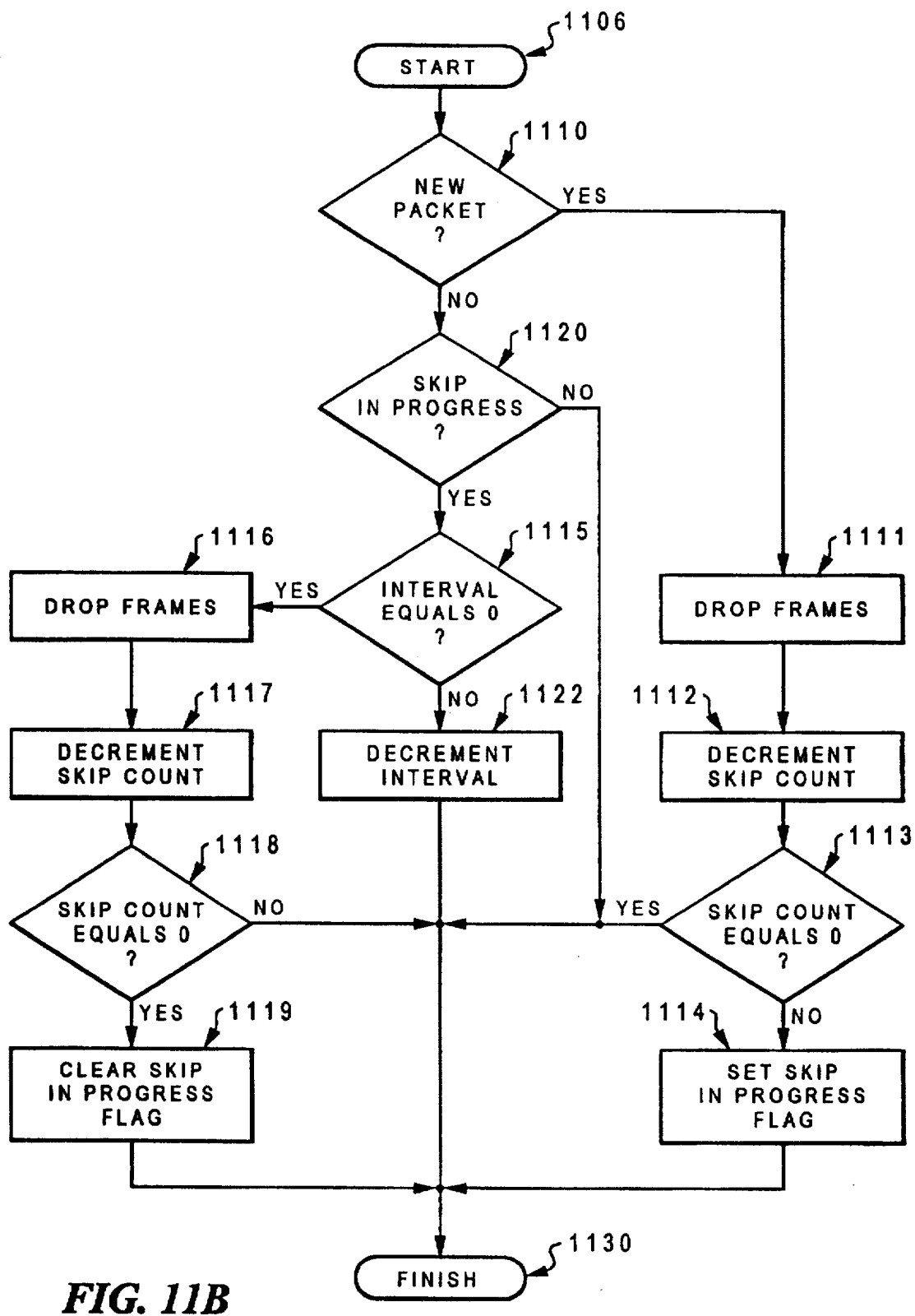

FIGS. 9A and 9B when placed together form a flowchart which illustrates a method for synchronizing related media streams according to an illustrative embodiment of the invention;

FIG. 10 illustrates a ring buffer used to store information for an illustrative embodiment of the invention; and FIGS. 11A and 11B are flowcharts which illustrate a method used by a media source to drop frames according to an illustrative embodiment of the invention.

DESCRIPTION OF THE ILLUSTRATIVE EMBODIMENT(S)

Though the description below sometimes uses terminology that may be peculiar to IBM products, this terminology is for illustrative purposes only. Those skilled in the art will appreciate that the inventive method and apparatus for synchronizing multimedia streams using feedback is applicable to other existing and future systems.

Figure 4:
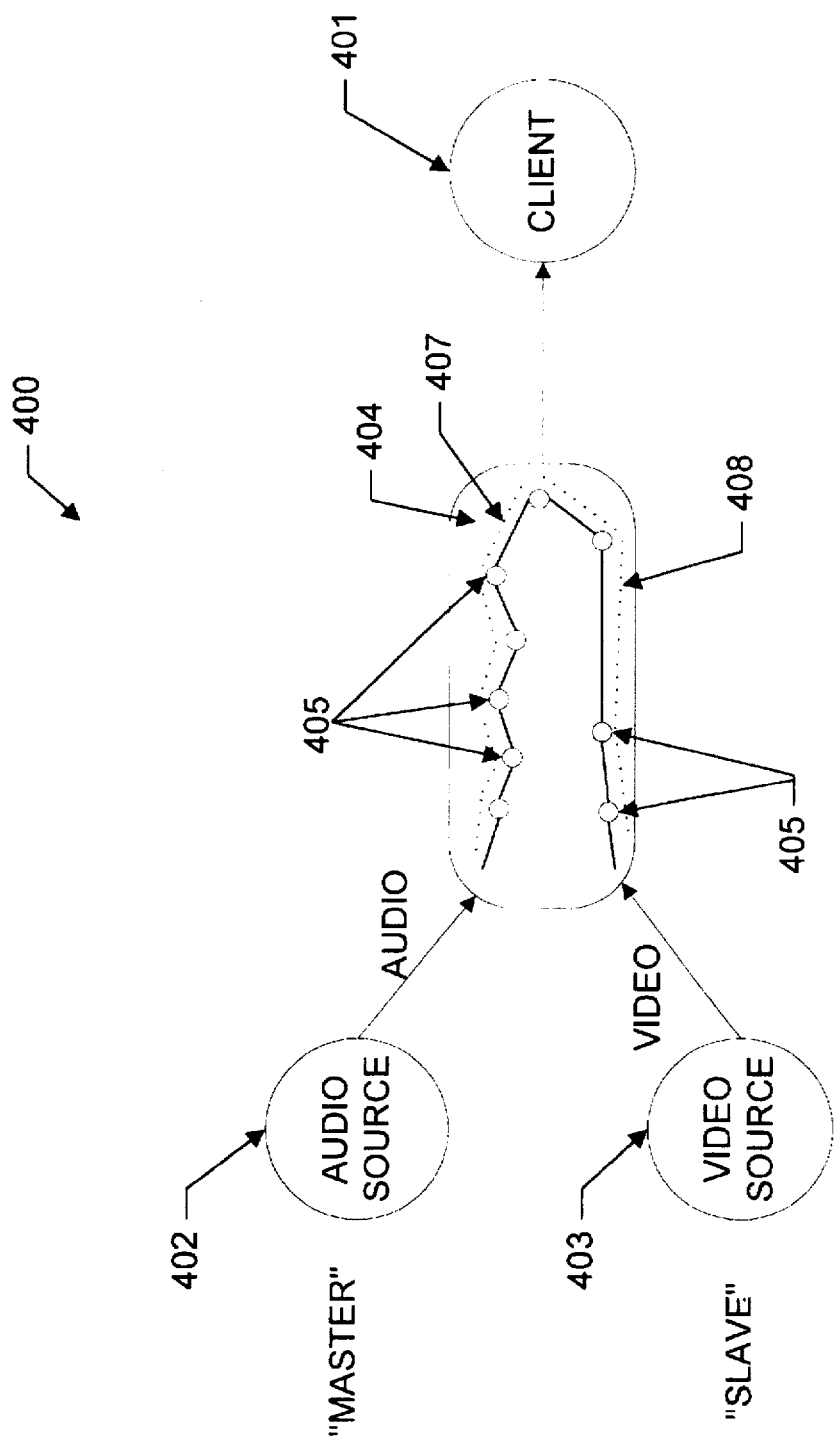
FIG. 4 illustrates a conventional computer network.
Figure 5:
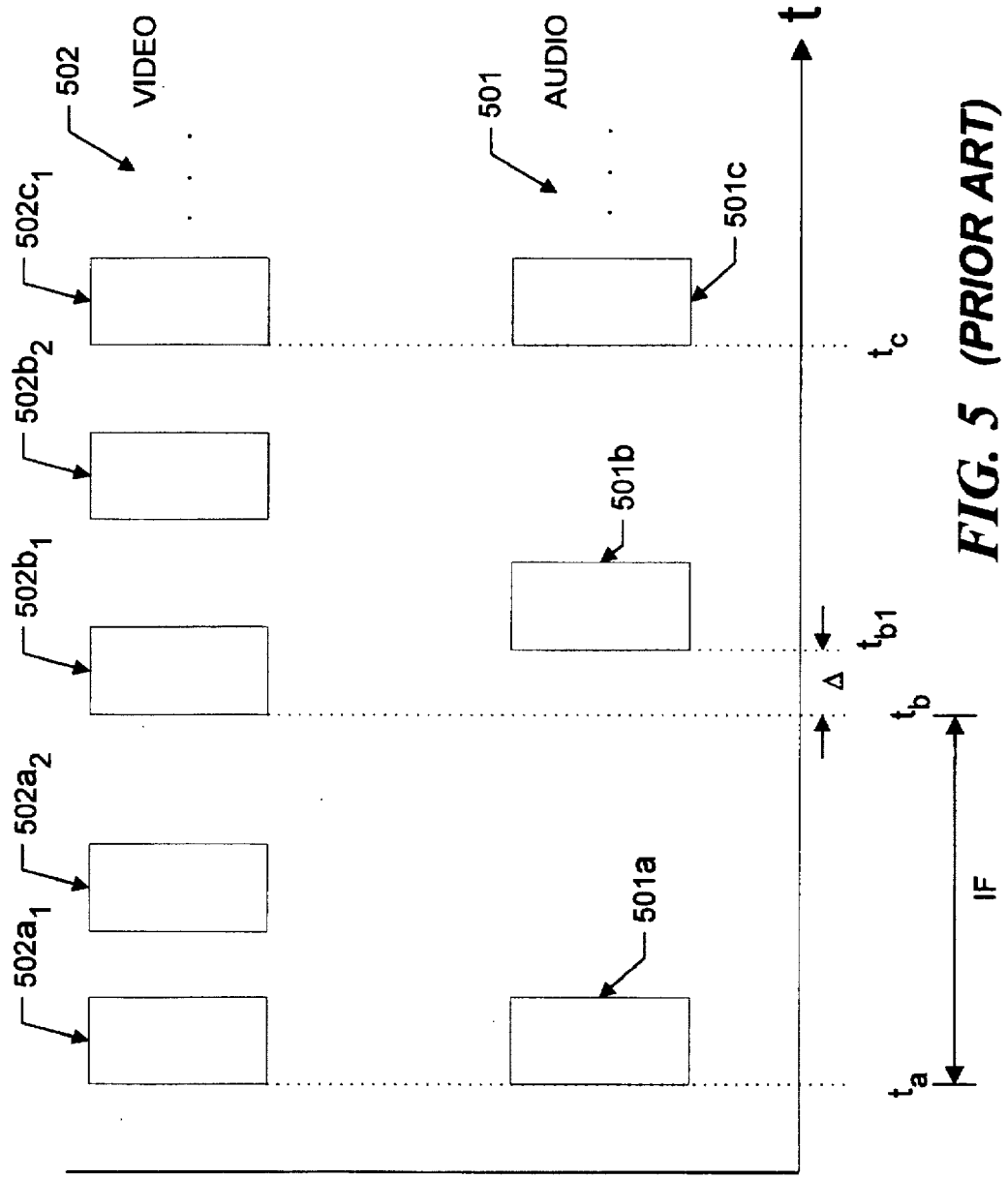
FIG. 5 illustrates prior art related media streams having inter-media discontinuity.
Figure 6:
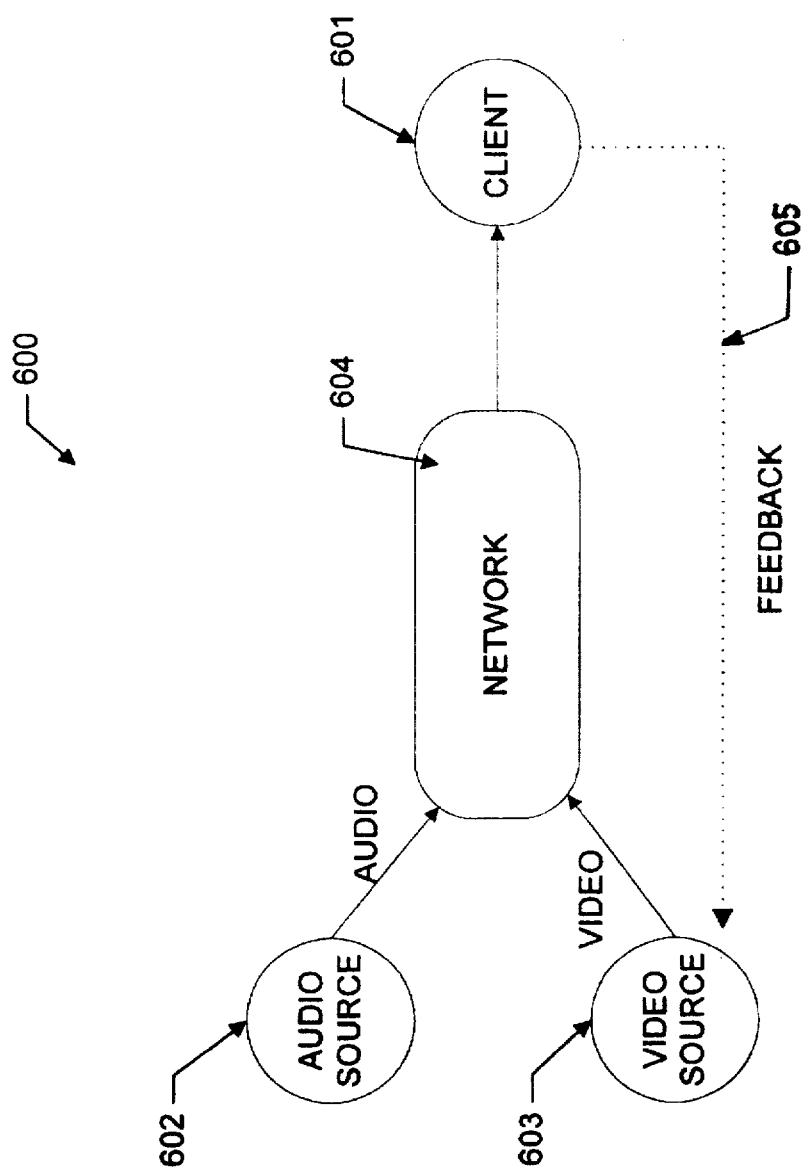
FIG. 6 illustrates a computer network arranged according to an illustrative embodiment of the invention.

FIG. 6 illustrates a distributed system 600. Audio server 602 and computer network 604 are similar to the conventional components 402 and 404 of FIG. 4, respectively. However, the target, or client 601, and video server 603 are modified in accordance with the principles of the present invention. Audio source 602 generates audio information in the form of a stream of audio data blocks, which are transferred over network 604 to client 601. Similarly, video source 603 generates video information in the form of a stream of video data blocks, which are transferred over network 604 to client 601.

In accordance with the principles of the invention, the dashed line 605 indicates that control information, described below, is transferred from the client 601 back to video server 603. This control information is actually transferred across the network 604 using conventional techniques, but is, nonetheless, indicated as a separate dashed line to more clearly illustrate the novel control flow, not present in the conventional system of FIG. 4. In particular, client 601 is modified to generate the control information, and video source 603 is modified to receive the control information and modify the generation of video data blocks in a manner described below.

Figure 1:
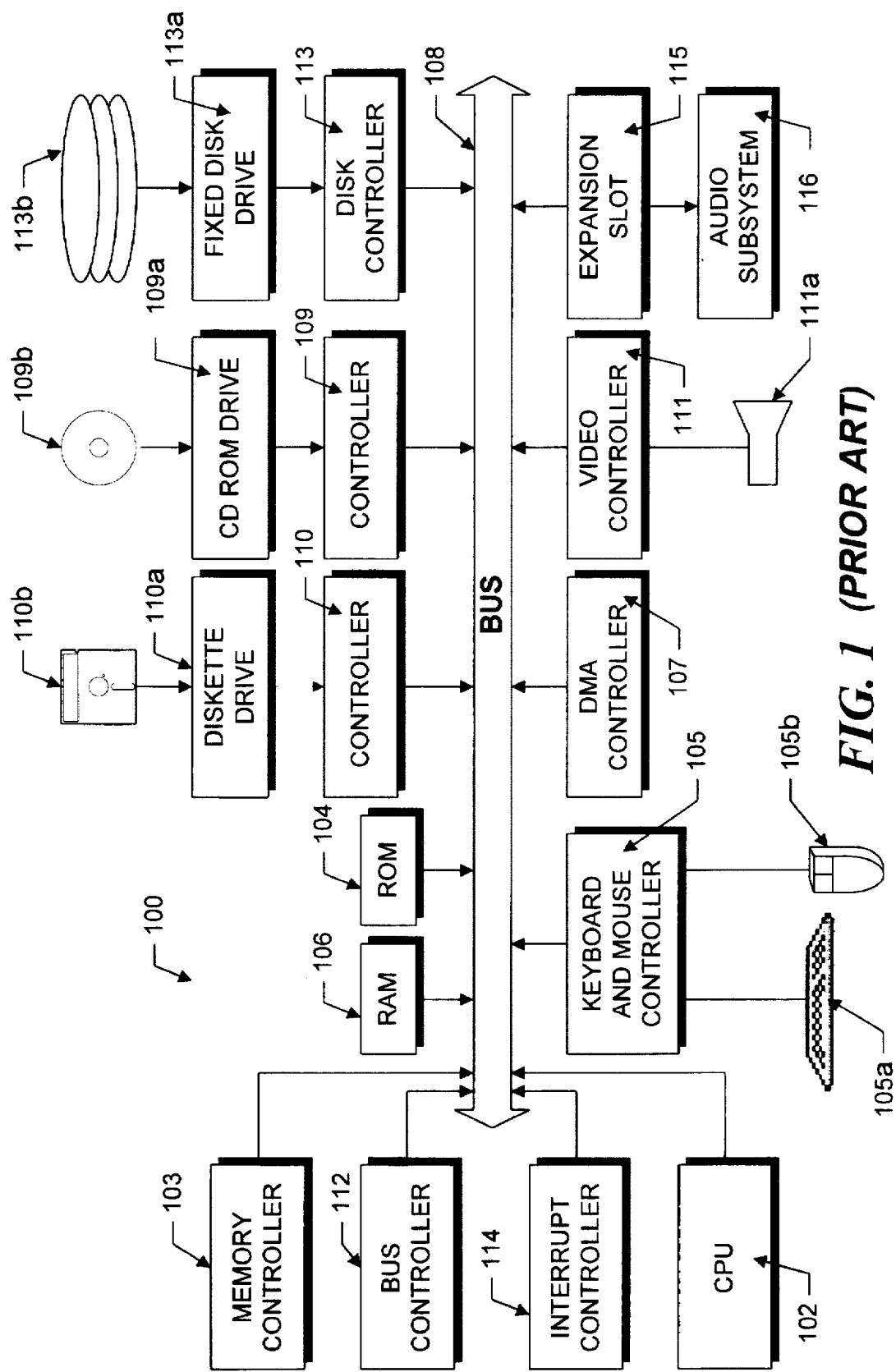
FIG. 1 is an exemplary conventional personal computer.

Video server 603 and client 601 may be implemented on conventional hardware, such as the computer hardware of FIG. 1. In an illustrative embodiment, the client 601 and server 603 use the OS/2® operating system and Multimedia Presentation Manager ("MMPM/2"), commercially available from IBM. MMPM/2 is a separately installable portion of the OS/2 operating system which provides specialized multimedia support, including a multimedia control interface. Among other things, MMPM/2 provides software routines that can create a media stream and which can perform certain operations, such as play or pause, on a media stream. The MMPM/2 also includes a Stream Synchronization Manager (SSM), which is an independent "thread" executing under the direction of the OS/2 operating system. A thread is akin to a process, and for purposes of understanding this invention, a thread may be thought of as a process. The SSM generally provides certain timing information and centralized buffer management so that streams may be buffered and synchronized. In certain cases, the timing information causes SSM to instruct the MMPM/2 routines to drop frames, similarly to that outlined above.

The conventional portions of the OS/2 operating system and the MMPM/2 multimedia package will be described to the extent they are material to understanding the invention. The reference publication, *Multimedia Manager Tool Kits/2, Subsystem Development Guide*, available from IBM Corp., provides a thorough description of the MMPM/2 package, in relation to the OS/2 operating system, and is hereby incorporated by reference.

The video server 603 includes novel supplemental software, described below, for receiving the feedback 605. The client 601 also includes other novel, supplemental software, described below which generates the feedback 605.

During the operation of the system, a multimedia application resides on client 601 and makes multimedia stream requests to the OS/2 operating system and MMPM/2 in a conventional manner. The application, for example, may make such requests at a fairly high level of abstraction, using request language such as "CREATE A STREAM" and "PLAY A STREAM," or "PAUSE A STREAM." The responses to these requests and the mechanics of creating, playing, and pausing are handled partly by the operating system and partly by MMPM/2, as modified by the invention and described in detail below. If such a request involves a remote source, the appropriate information is transmitted across computer network 604 in a manner similar to the conventional system of FIG. 4. For example, the servers represented by the sources 602 and 603 may be requested to open files, provide media streams, write files, and the like.

Figure 7:
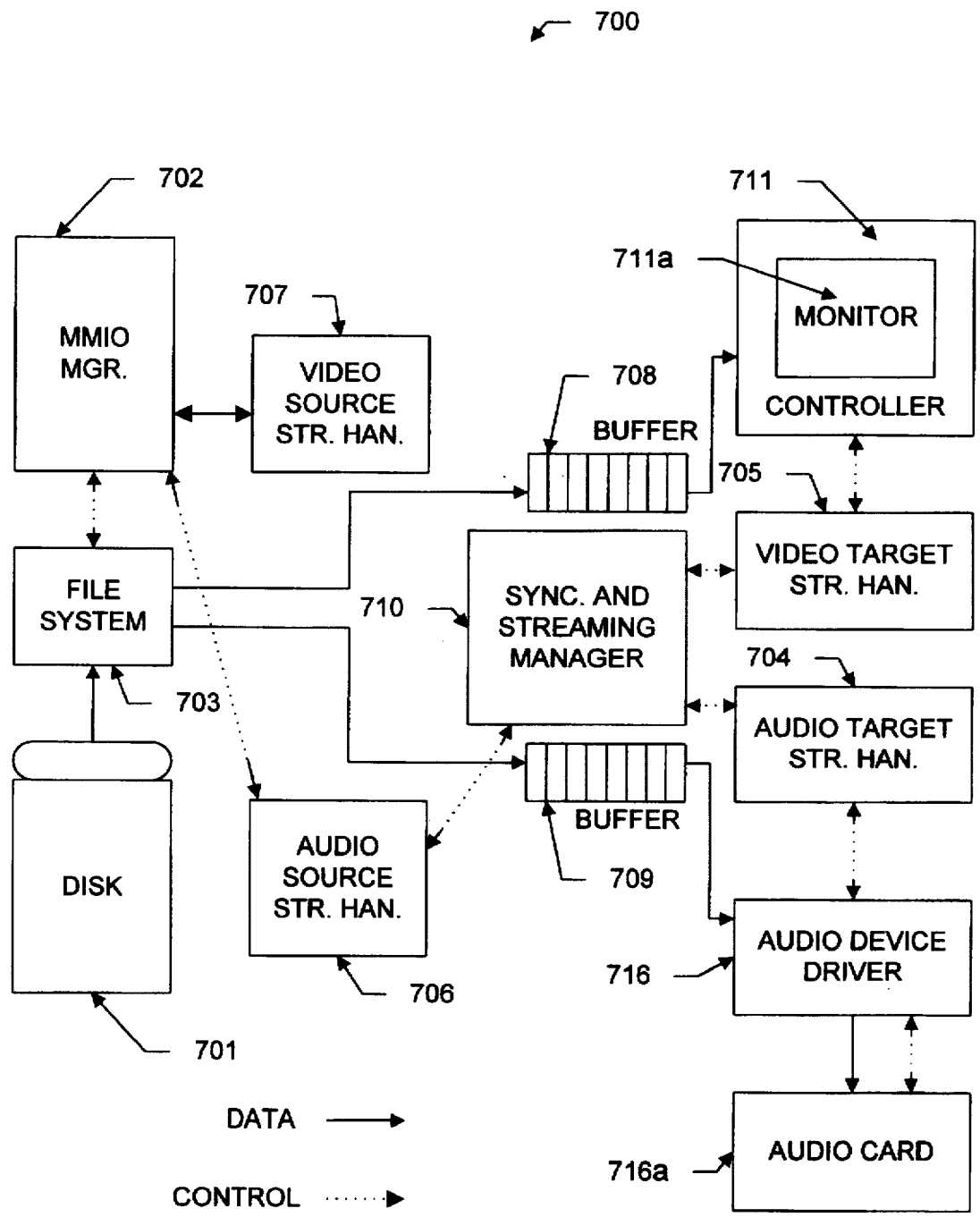
FIG. 7 illustrates the client software and hardware architecture of an illustrative embodiment of the invention.

FIG. 7 illustrates the software architecture 700 of the MMPM/2 multimedia software package and associated hardware located at the client 601. This architectural illustration includes only those aspects of MMPM/2 that are material to understanding the invention. Certain aspects have been simplified or omitted for clarity of description. FIG. 7, for example, discloses a disk 701, but does not explicitly show other well-known storage devices, such as an optical disk or CD-ROM, even though the system and application may include and use such devices in a conventional manner.

Applications use MMPM/2 software routines by calling subroutines which, collectively, define a media-control interface. These calls have a specific, pre-defined protocol and are generically designated as media-control interface calls (MCI calls).

The MCI calls invoke a media control driver (MCD), which, in turn, invokes the various components of MMPM/2. For example, the MCD may invoke a multimedia I/O services (MMIO) manager routine 702 to perform certain functions, such as finding and opening a specified file. The interface between the MCD and the MMIO routine is standardized. Consequently, the MMIO 702 isolates the rest of the code from the actual file manipulation routines which depend on such factors as whether the file is local, i.e., located on the same node as the client 601, or remote, i.e., located on a different node of the network 604, such as, the node where video server 603 is located.

Among other things, the MMIO routine 702 will handle any file format dependent operations. For example, in the case of video data, MMIO 702 will use appropriate code to determine the type of video data being used so that an appropriate software compression/decompression algorithm (CODEC) may be initialized and used for compressing and decompressing the video data. Various CODECs are commercially available, their operation and construction being well known in the art. A video CODEC suitable for use with the invention is the Ultimotion™ CODEC, available from IBM.

In response to a request to create a stream, the MCD routines initialize media stream handlers, e.g., stream handlers 704–707. Each stream handler 704–707 is a separate thread that gains use of the system CPU, under the scheduling control of the OS/2 operating system. In general, a stream handler controls the processing of data at a certain point in the stream. For example, video target stream handler 705 is responsible for handling the video data so that it may be displayed on monitor 711a via controller 711. Among other things, target handler 705 may invoke the video CODEC to decompress compressed video data, stored in RAM 106 (see FIG. 1), and to store the decompressed image in VRAMS of the monitor controller 711 so that the image may be displayed on monitor 711a or further processed by the controller 711.

The contents of a particular stream handler will, among other things, depend upon the type of data, e.g., video or audio, the format of the data, e.g., YUV or RGB color video data format, and whether the handler is a source handler or target handler. The detailed construction of stream handlers is well-known and will not be discussed further.

Generally, stream handlers are scheduled for execution by the operating system. More particularly, a handler, just like other processes and threads, is scheduled by the OS/2 operating system to use the CPU 102 (FIG. 1), depending upon the handler's priority in relation to the priorities of other processes waiting to use the CPU.

When a stream is created, the MCD causes the MMIO manager 702 to initialize source stream handlers at the client, illustratively handlers 706 and 707 in FIG. 7, so that the stream handler may either "pull" blocks of media data into corresponding buffers 709 and 708, respectively, or react to data that is "pushed" by a server, such as server 603 (FIG. 6). The MCD will also cause the sources of the data and the target handlers to be appropriately initialized.

Pulling, as previously mentioned, refers to a conventional operation in which a source stream handler located at the client makes explicit requests to the source for more media data. The source stream handler will make such requests when there is sufficient room in the buffer in which the pulled data will be stored. Generally, buffers are of a fixed size. Media frames, however, may be of variable size. Consequently, the source stream handler determines whether buffer space is available for more media data by determining which buffered frames have been read. This may be done, for example, by analyzing a frame's header, which may include a field that, if marked, indicates the frame has been used.

If sufficient room for a new block of media data exists in the buffer, a source stream handler operating in pull mode will request more data from the server. The data transmitted from the source is transmitted as a block, which may include many frames of media data. Upon receiving the block, the source handler places the block into the appropriate buffer.

Pushing, in this context, refers to another conventional operation in which a server automatically provides blocks of media data at predetermined intervals. The predetermined intervals and the size of the blocks are programmed at initialization of the source. In accordance with one embodiment, the server utilizes MMPM/2 routines to perform the pushing operation. Such a server has a set of functionality that is analogous to that of a client.

In accordance with the principles of the present invention, the conventional pushing and pulling operations are modified in certain respects by controlling the provision of media data with negative feedback. Generally, this control causes media frames to be dropped at the source before they are transmitted, if the recent history of the system indicates that, if the frames are not dropped at the source, these or other frames may be dropped at the target. By dropping the frames at the source, the network is used more efficiently, thus enhancing system performance.

The modifications to pushing and pulling operations are described below. To clarify the description, only those aspects of conventional pulling and pushing that are material to understanding the invention will be described. The following example explains the media data flow in relation to the various stream handlers illustrated in FIG. 7.

Assume audio source stream handler 706 is scheduled by the OS/2 operating system to gain access of the CPU and that audio source stream handler is operating in push mode. Stream handler 706 includes the appropriate code to direct incoming audio data to buffer 709. After directing the data to the buffer, source stream handler 706 requests the operating system to place the handler 706 in a "sleep state" until it is needed when new pushed data arrives.

The term "sleep state" is known in the art and indicates that a particular process does not desire to use the CPU, until a certain event occurs or until a certain time is reached. When the executing process is placed in a sleep state, the scheduler of the operating system schedules another process to use the CPU, usually based upon the priority of a process in relation to other waiting processes.

Assume that video source handler 707 operates in pull mode. When video source handler 707 gains access of the CPU, it places any previously-requested data into buffer 708 and then determines whether buffer 708 has room for another block of video data. An exemplary method of making such a determination is outlined below. If the buffer 708 can handle more data, handler 707 requests another block of video data by causing a network message to be sent, via MMIO 702 to the data source, i.e., server 603. Server 603, in turn, receives this message and provides a block of data to the client 601, where MMIO 702 and stream handler 707 direct the data into the appropriate buffer space 708.

Figure 2:
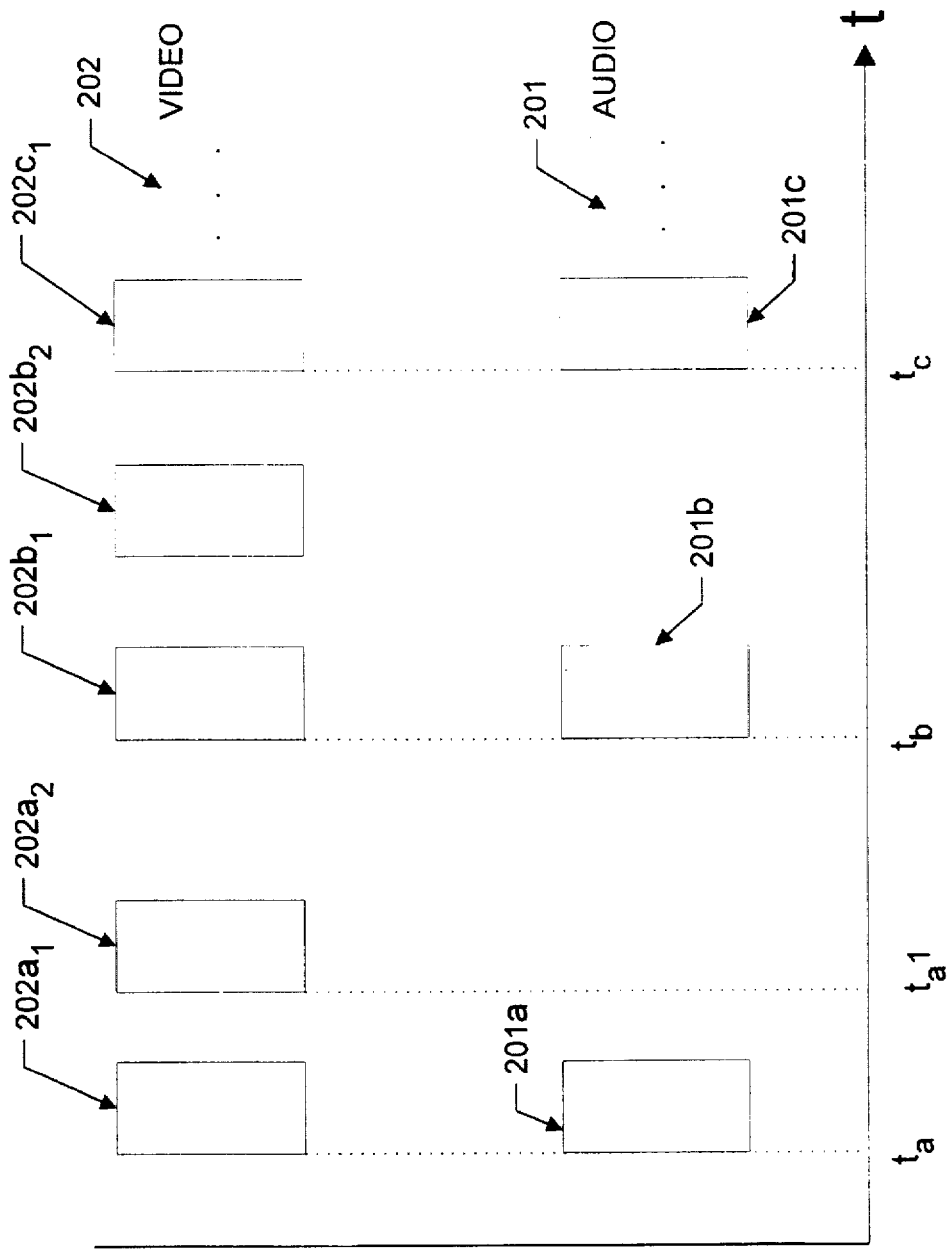
FIG. 2 illustrates prior art media streams in synchronism.
Figure 3:
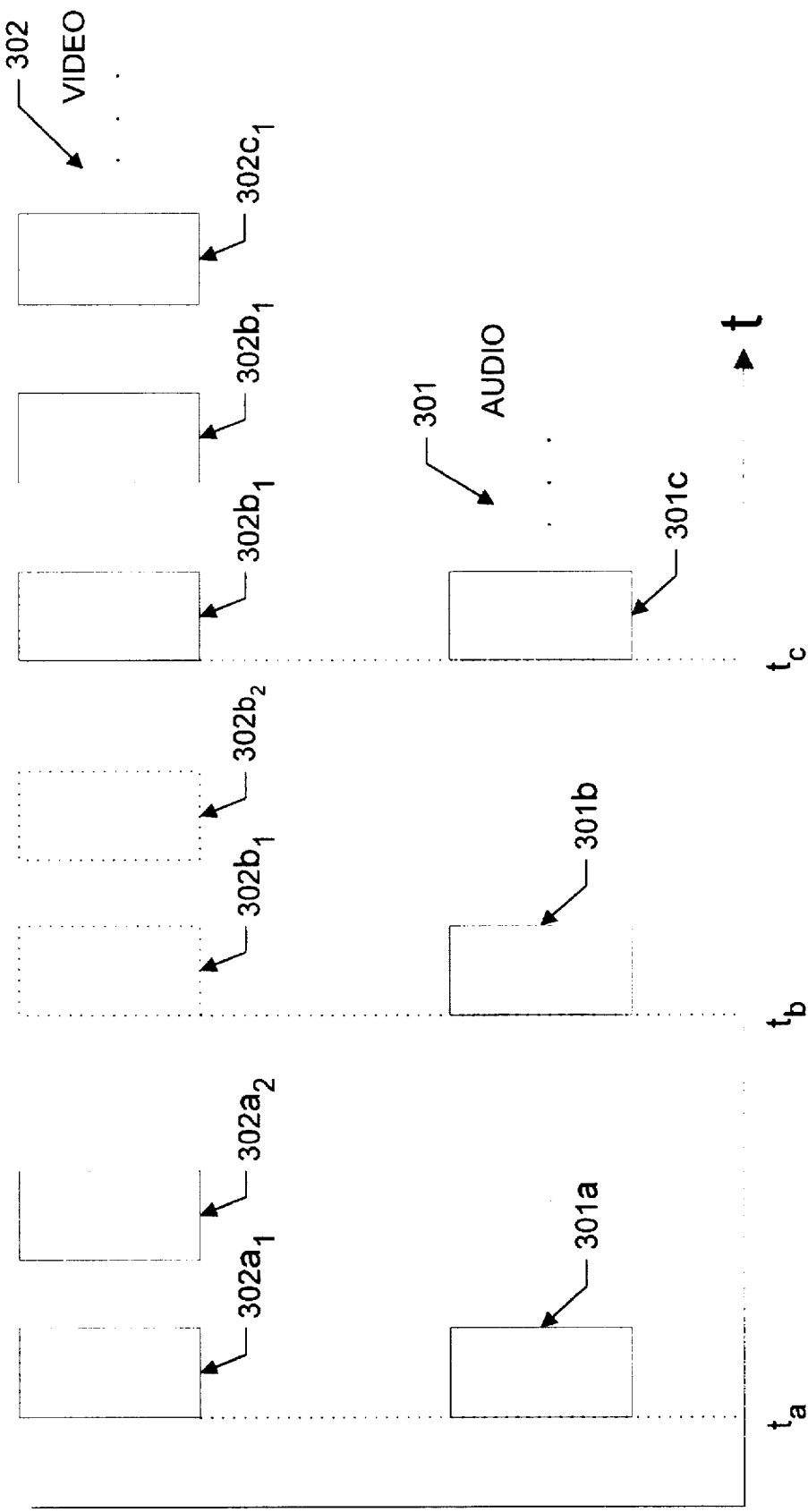
FIG. 3 illustrates a prior art media stream having a delayed frame.

Audio target stream handler 704 is eventually scheduled to use the CPU. At that time, the target stream handler 704 uses data from buffer 709 to appropriately instruct an audio subsystem 116 (FIG. 1) to produce audio playback. The audio target stream handler 704 then calculates a time when it next needs the use of the CPU. This time will depend on a predetermined or "authored" playback rate for the audio. The authored rate refers to the rate at which the media streams are intended to be played back at, and this information is provided to the handler at initialization of the stream. Referring to FIG. 2, as an example, if the current time is $t_a$, the handler 704 calculates that the next time it will need the CPU is $t_b$. The handler 704 then requests be put in a sleep state by the operating system, until time $t_b$.

After the handler 704 is put to sleep, the operating system schedules a next process to use the CPU. Because of the priorities associated with the various handlers, the next process to be scheduled is likely to be video target stream handler 705. Video target stream handler 705 may program the monitor and controller 711, 711a and possibly invoke a CODEC to decompress data in buffer 708 to display a video image on monitor 711a. The invocation of a decompression routine (e.g., the routine in the aforementioned Ultimotion CODEC) involves passing to the decompression routine a pointer, indicating where in RAM 106 (see FIG. 1) the compressed video data are stored. In the present example, this pointer will indicate a location within buffer 708. The decompression routine is also provided with a second pointer, indicating where the decompressed image should be placed. This second pointer typically indicates a memory address mapped to VRAMs, which are scanned by controller and monitor 711, 711a to produce an image.

When video target stream handler 705 is finished with its operations, it calculates a next time when it will need the CPU. In the example of FIG. 2, if the current time is $ta$, the video stream handler 705 would need the CPU at time $t_a1$, and not at time $t_b$.

The SSM 710, among other things, provides timing information to the stream handlers so that the streams may be synchronized in relation to one another. To this end, as will be described below, the various stream handlers report their progress to the SSM.

As stated above in the background section, some media streams are more critical than others and thus some mechanism must be provided to synchronize the streams. The MMPM/2 routines operate according to a paradigm in which an application designates a stream as a master stream, which is assumed to be critical, and designates other related stream(s) as slave streams, which are assumed to be less critical. Audio streams are often designated as the master stream, although they need not be. The examples below, however, use an audio stream as the master stream and a video stream as a slave stream.

In general, a slave stream is synchronized relative to a master stream. In particular, the SSM helps the stream handlers control the slave streams according to the characteristics of the master stream, rather than according to some absolute desired time. For example, if the master stream has a delayed frame, the slave streams will be delayed accordingly, even though corresponding frames in the slave streams, in the absence of synchronization, may have arrived at their desired times. The slave streams are always adjusted to match the master stream in this case.

FIGS. 9A and 9B collectively form a flow chart that more particularly illustrates the method of adjusting the playback of a slave stream to synchronize it with a master stream. To better understand the description, FIG. 7 should be referred to in conjunction with the discussion of FIGS. 9A–B.

Generally, synchronization between a master stream and a slave stream is performed in two parts. First, the master stream handler 704 and the slave stream handler 705 keep the SSM 710 informed of their "perceived" stream times. The perceived stream time may be equated to the position of a frame in the stream, as opposed to the amount of time the stream has been active.

Second, the SSM 710 monitors the two stream times and informs slave stream handler 705 whenever the slave stream is not in synchronism with the master stream time by more than a pre-programmed tolerance.

The routine starts with step 900 and proceeds to step 901 in which slave stream handler 705 gets the current time from the system timer. Slave stream handler 705 calculates its next desired "wake-up" time by adding an interframe time interval (which depends on the authored playback rate) to the current time, in step 902.

In step 903, slave stream handler 705 determines whether SSM 710 is indicating that the slave stream is in asynchronism by more than a predetermined tolerance with the master stream.

If the streams are not in asynchronism more than the predetermined tolerance, then, in step 904, handler 705 performs the necessary actions to process the current slave media frame, including informing the SSM of its perceived time. In step 905, slave stream handler 705 requests the operating system to put the handler 705 in a sleep state until the wake-up time. Then, in step 920, the flow ends, as the process is in a sleep state.

If, in step 903, the SSM 710 indicates that the streams are in asynchronism by more than the predetermined tolerance, then, in step 906, handler 705 calculates the amount of asynchronism, and, in step 907, the handler determines whether the slave stream is ahead of or behind the master stream.

If the slave stream is ahead of the master stream, in step 908, handler 705 adjusts the wake-up time, calculated in step 902, by adding the error amount, calculated in step 906, to the wake-up time. This adjustment has the effect of slowing down the slave stream. Handler then proceeds to step 904 to process the frame and go to sleep, as discussed above.

If the slave stream is behind the master, in step 909, handler 705 determines whether the slave stream is "chronically" behind the master. "Chronically" behind is defined as a stream error which exceeds a predetermined tolarance amount.

If the slave stream is not chronically behind the master stream, handler 705 decreases the wake-up time interval by subtracting the calculated amount of asynchronism in step 910. The handler then proceeds to step 904 to finish processing of the frame and then goes to sleep, as discussed above.

If the slave stream is chronically behind, target slave stream handler 705 proceeds to step 911, which causes frame(s) to be dropped at the target. The dropping of frames at the target is a conventional operation which is dependent upon the type of data of the slave stream. In the case of a video slave stream, for example, step 911 may entail handler 705 instructing a CODEC to drop frames. Some data formats, such as Ultimotion video format, require more sophistication because only certain video frames may be dropped without causing appreciable distortion. For example, in an Ultimotion formatted system, only the last "delta" frame(s) before a succeeding "intra frame" can be dropped. Locating these frames is accomplished with known routines of the MMPM/2 library and is conventional.

In accordance with the principles of the invention, after a frame is dropped at the target, in step 911, handler 705 updates an internal data structure in step 912. In one embodiment, a ring buffer 1000 of fixed length (see FIG. 10) is employed to record the number of frames that were dropped in step 911 and the time when the frame(s) were dropped. Ring buffers are well-known data structures. Each entry 1001 of ring buffer 1000 contains a component 1001A which indicates the number of frames that were dropped at a given instance and a component 1001 B which indicates the time when the frames were dropped. As such, the ring buffer 1000 keeps a temporal window comprising a fixed number of instances when a frame or frames were dropped at the target. When a new dropping instance is added at the ring buffer top (identified by pointer 1005), the stored instance at the buffer bottom (identified by pointer 1010) is discarded. As new instances are inserted, pointers 1005 and 1010 move in the direction indicated by arrow B. Thus, the ring buffer stores the most recent dropping instances. Many alternative conventional, static or dynamic, data structures may be employed to record this information, rather than a ring buffer.

In steps 913 and 914, target stream handler 705 analyzes this data structure to determine whether the number of frames dropped at the target over a period of time is greater than a predetermined threshold. In one embodiment, for example, handler 705 traverses the ring buffer in the direction indicated by arrow A; from the buffer top, i.e., the most recent entry, identified by pointer 1005, towards the buffer bottom, i.e., the oldest entry, identified by pointer 1010. At each entry, handler 705 examines the stored time component to determine whether the entry occurred within a predefined interval of time. If so, the number of frames dropped is added to a running total. The entries are sequentially examined while the stored time remains within the time interval to determine whether the number of frames which were dropped within the fixed time interval, for example the past minute, exceeds a predetermined threshold, illustratively, twenty. This exemplary threshold was chosen because the illustrative embodiment was limited to relatively small video streams, i.e., less than one gigabyte of total information. Streams of other sizes may likely need different thresholds.

Referring back to FIGS. 9A–B, if the threshold is not exceeded, handler 705 proceeds to step 916, where the wake-up time is adjusted, as discussed above. The current frame is then processed and handler 705 goes to sleep, as discussed above in connection with steps 904, 905 and 920.

If, however, the threshold is exceeded, target stream handler 705 instructs the data source, e.g., server 603, that frames should be dropped at the source in step 915. Slave handler 705, then, proceeds to step 916, discussed above, where the wake-up time is adjusted, followed by processing the frame, step 904, and going to sleep, step 905, discussed above.

In the description above, steps 912–915 are implemented in the target handler 705. These steps, however, may be alternatively off-loaded to another process. The other process would receive a message, or other form of inter-process communication, from handler 705 that would indicate the number of frames dropped in step 911 and the time at which they were dropped. Such other process would then update a data structure and perform functions analogous to that discussed above.

Figure 8:
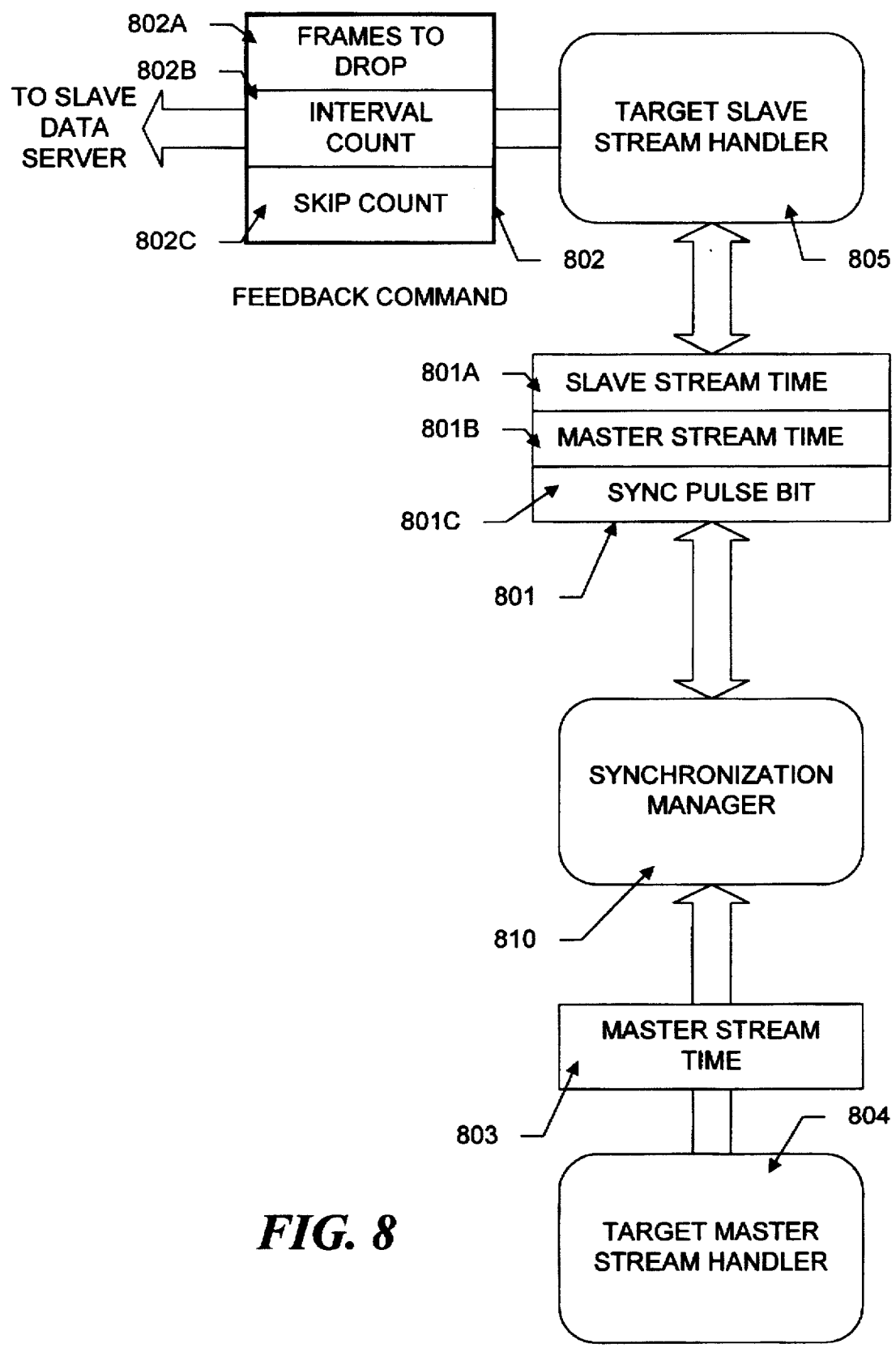
FIG. 8 illustrates the client software architecture of an illustrative embodiment, of the invention, including a data structure.

FIG. 8 illustrates the relationship of the various streams at the target and the data structures used to store the feedback information in accordance with the principles of the invention. Referring to FIG. 8, the master target stream handler 804 regularly updates SSM 810 in a conventional manner, indicating the master stream time 803, as discussed above.

SSM 810, in turn, places this information in a shared data structure 801 at entry 801B. Each target slave stream handler 805 also accesses the data structure 801 to store its slave stream time 801A. In addition, as stated above, at certain times handler 805 will need to access the structure 801 to determine the amount of asynchronism between the stream times.

Data structure 801 is regularly monitored by SSM 810, which sets a sync pulse bit 801C upon detecting a tolerance violation.

Regardless of whether the slave stream is being pulled or pushed, the data source is informed when frames need to be dropped at the source by a feedback mechanism. For example, a feedback communication link between target stream handler 805 and the slave data source may be created at the initialization of stream handler 805. Alternatively, this link may be created the first time target stream handler 805 detects that the source stream handler needs to drop frames, as previously discussed with regard to step 914.

In an illustrative embodiment, which is implemented on a client-server network system 600 of FIG. 6, target stream handler 805 in client 601 causes a network packet 802 to be created containing control information entries 802A–802C. Packet 802 is transmitted over network 604 to a source stream handler in server 603 using techniques known in the art.

The control information passed to server 603 includes, illustratively, the number of frames to drop (Frames to Drop 802A), the interval count between skips (Interval Count 802B), and Skip Count 802C. Field 802A indicates the number of non-critical, contiguous frames that should not be transmitted, i.e., dropped at the source. For example, in the case of Ultimotion video, this may indicate that the server should drop the last delta frame before an intra frame, or key frame, or that it should drop the last five delta frames before an intra frame.

Field 802B indicates the number of frames to wait before attempting to drop frames again. For example, if interval count field 802B indicates fifteen and field 802A indicates one, one delta frame would be dropped and fifteen frames would pass before dropping another frame.

Skip Count field 802C is a loop count. If the above example is modified to include a skip count of four, one frame would be dropped; fifteen frames would pass; a second frame would be dropped; fifteen more frames would pass; and so on, until four frames were dropped.

In accordance with alternative embodiments of the invention, other fields might be dynamically modified, or, such fields could store entire control packets as a data structure, rather than dynamically modifying the control fields of a static data structure. The information in such packets could be retrieved from the data structure by indexing into the structure according to the degree of asynchronism between the master and slave streams.

As suggested above, server 603 may utilize MMPM/2. If a data stream is being pulled, a corresponding handler will be invoked in response to pull requests from the client. If the stream is being pushed, a corresponding handler will be invoked at preset, authored intervals.

The media frames for a given stream may be pre-fetched from the appropriate file and placed into a buffer, for example, by using conventional MMIO routines. The buffered data may then be transmitted to the client. Conventional MMIO and MMPM/2 routines may be used by the handler to identify buffered data having given characteristics. For example, if the server is providing Ultimotion formatted video data, the server 603 may utilize conventional MMPM/2 routines to identify the last delta frame before a subsequent intra frame, for example.

FIGS. 11A and 11B are illustrative flowcharts showing portions of the server code which controls the transmission of data frames from the server to the client. FIG. 11A illustrates a routine for processing incoming feedback packets which may be activated when server 603 receives a control packet 802 from client 601. Server 603 starts at step 1100 and, in step 1101, verifies the data in fields 802A–802C of packet 802 to check for errors and the like.

In step 1102, server 603 associates the control packet with a particular stream being pushed by or pulled from server 603. Server 603 may theoretically be pushing or pulling many streams. This step also verifies that a particular media stream is still active. Such association is performed with techniques known in the art.

In step 1103, fields 802A–802C are stored in a control block for that stream, and in step 1104, a state variable is set indicating that a new control packet 802 has been received for that stream, and the routine ends at step 1105.

FIG. 11B is a flow chart illustrating a portion of a routine in the server code which is invoked when blocks of media data need to be transmitted to the client. The routine adjusts the generation of media frames at the source, i.e., causes dropping of frames at the source. More particularly, this exemplary routine drops delta frames from a video slave stream. Those skilled in the art may straightforwardly modify this example to extend it to other media types. The server code that actually pushes data or responds to pull requests is conventional and will not be described for the sake of brevity.

The routine starts at 1106 and determines in step 1110, whether the new control packet state variable, discussed above, is set. If so, the routine begins to process the buffered data according to the new control information in the control block, even if a prior control packet was not completely processed. In step 1111, the routine drops the last delta frame(s) to indicate that they need not be transmitted by the conventional transmission code.

In step 1112, the skip count stored in the control block is decremented. In step 1113, the decremented skip count is compared to zero to determine if the predetermined number of frames has been dropped. If the skip count equals zero, the routine proceeds to finish in step 1130.

If, in step 1113, the decremented skip count does not equal zero, a second state variable is set, in step 1114, indicating that frame skipping is in progress. The routine then proceeds to step 1130, the end of the routine.

When the routine for the same stream is next awakened, the routine again enters step 1110. If no new control packets have been received for the stream, and the skip in progress state variable is still set (step 1110 and 1120, respectively) the routine proceeds to step 1115, in which the routine determines whether the number of frames indicated by the interval count field of the control block have been transmitted.

If the interval count is not equal to zero, the interval count is decremented in step 1122, indicating that the routine has waited for another frame. The routine then proceeds to step 1130 to end the flow, awaiting to be awakened later.

If, in step 1115, the interval count equals zero, the routine proceeds to step 1116 in which the routine drops the last delta frame or frames, as instructed in the control block.

In step 1117, the skip count is decremented, and in step 1118, the skip count is tested to see if the frame dropping is done. If so, the skip in progress state variable is cleared, in step 1119, to indicate that skipping is no longer in progress and the routine proceeds to step 1130. Alternatively, if, in step 1118, the skip count is not equal to zero, the routine is done and proceeds to step 1130 to be awakened later.

The foregoing description has been focused upon an illustrative embodiment, and certain variations, of the invention. Other variations and modifications, however, may be made to this embodiment, which will attain some or all of the advantages of the invention. The present invention, however, applies to present and future technologies which may be used instead of these technologies. It is, therefore, an object of the appended claims to cover all such variations and modifications that come within the true spirit and scope of the invention.

For example, many alternative embodiments of the routines shown in FIGS. 11A and 11B may be used to process the feedback control information. In addition, different feedback control information may be provided from the client to the server in lieu of that shown in FIG. 8.

Moreover, the invention may be utilized on a variety of hardware and software platforms including other PC architectures, workstations, and the like. Likewise, the invention may be applied to multimedia applications that do not use multitasking.

Many of the above examples focused on Ultimotion formated video data slave streams. Nonetheless, those skilled in the art will understand how to apply the invention to other stream types and formats.

In an alternate embodiment, the invention may be implemented as a computer program product for use with a computer system. Such implementation may comprise a series of computer readable instructions fixed on a computer readable media such as diskette 1106, CD-ROM 1096, ROM 1104, or fixed disk 1136 of FIG. 1, the series of computer readable instructions embodying all or part of the functionality previously described herein with respect to the invention. Those skilled in the art will appreciate that such computer readable instruction can be written in a number of programming languages for use with many computer architectures or operating systems, and, further, that such instructions may be stored using any memory technology, present or future, including, but not limited to, semiconductor, magnetic, optical or other memory devices. It is contemplated that such a computer program product may be distributed as a removable media, e.g., shrink wrapped software, preloaded with a computer system, e.g., on system ROM or fixed disk, or distributed from a server or electronic bulletin board over a network, e.g., the Internet or World Wide Web.

What is claimed is:

1. Apparatus for synchronizing a slave media stream to a master media stream, the slave media stream having a plurality of slave media data blocks sequentially transmitted from a slave data source to a data target, and the master media stream having a plurality of master media data blocks sequentially transmitted from a master data source to the data target, the slave media blocks and the master media blocks being transmitted across a computer network, the apparatus comprising:

means, located at the data target and responsive to the plurality of slave media data blocks and the plurality of master media data blocks arriving at the data target, for comparing stream times of the slave media data blocks and the master media data blocks to determine a timing difference between the slave media stream and the master media stream and for transmitting a feedback control packet across the network to the slave data source to cause the slave data source to omit selected slave media data blocks from transmission across the network, the control packet comprising: a frame drop number, indicating the number of slave media data blocks to drop at the slave data source at a given instance; an interval count, indicating the number of slave media data blocks to allow to pass before attempting to drop more slave media data blocks; and, a skip count, indicating the number of times to repeat dropping frames according to the frame drop number and the interval count;

means, responsive to the timing difference, for controlling the slave data source to omit selected slave media data blocks from transmission across the network, when the timing difference exceeds a first predetermined threshold; and means responsive to the timing difference exceeding a second predetermined threshold for dropping slave media data blocks at the data target and wherein the first predetermined threshold comprises a predetermined number of dropped slave media data blocks within a predetermined time period.

2. The apparatus of claim 1 further comprising means responsive to the timing difference exceeding a third predetermined threshold for transmitting a second feedback control packet from the data target to the slave data source.

3. The apparatus of claim 1 further including a data structure and means responsive to a slave media data block being dropped at the data target for storing information in the data structure, which information identifies the dropped slave media data blocks and times at which slave media data blocks were dropped.

4. The apparatus of claim 3 further including means responsive to the total number of dropped slave media data blocks for analyzing the data structure to determine the number of slave media data blocks dropped during the predetermined time period and wherein the number is used by the controlling means as the timing difference.

5. A method of synchronizing a slave media stream to a master media stream, the slave media stream having a plurality of slave media data blocks sequentially transmitted from a slave data source to a data target, and the master media stream having a plurality of master media data blocks sequentially transmitted from a master data source to the data target, the slave media blocks and the master media blocks being transmitted across a computer network, the method comprising the steps of:

A. receiving the plurality of slave media data blocks and the plurality of master media data blocks at the data target;

B. comparing stream times of the slave media data blocks and the master media data blocks to determine a timing difference between the slave media stream and the master media stream;

C. controlling the slave data source to omit selected slave media data blocks from transmission across the network, when the timing difference exceeds a predetermined threshold by transmitting a control packet across the network to cause the slave data source to omit selected slave media data blocks from transmission across the network, and transmitting a second control packet across the network when the timing difference exceeds a second predetermined threshold.

6. The method of claim 5 wherein the predetermined threshold is defined in terms of a predetermined number of frames being dropped at the data target within a predetermined time period and the method further includes the step of:

D. dropping slave media data blocks at the data target when the timing difference exceeds a predetermined temporal asynchronism.

7. Apparatus for synchronizing a slave media stream to a master media stream, the slave media stream having a plurality of slave media data blocks sequentially transmitted from a slave data source to a data target, and the master media stream having a plurality of master media data blocks sequentially transmitted from a master data source to the data target, the slave media blocks and the master media blocks being transmitted across a computer network, the apparatus comprising:

a CPU;

a memory;

a first software thread, stored in the memory and executable by the CPU, to cause incoming master media data blocks to be stored in the memory, in response to incoming master media data blocks being received by the apparatus;

a second software thread, stored in the memory and executable by the CPU, to cause incoming slave media data blocks to be stored in the memory, in response to incoming slave media data blocks being received by the apparatus;

a third software thread, stored in the memory and executable by the CPU, to cause stream times of the master stream and the slave stream to be stored in the memory;

a fourth software thread, stored in the memory and executable by the CPU, to cause the CPU to process the master media data blocks stored in the memory and to inform the third thread of the stream time of the master media data blocks being processed;

a fifth software thread, stored in the memory and executable by the CPU, to cause the CPU to process the slave media data blocks stored in the memory and to inform the third thread of the stream time of the slave media data blocks being processed;

wherein the third thread includes means for determining whether the stream time of the master stream and the stream time of the slave stream are in asynchronism exceeding a predetermined tolerance;

and wherein the fifth thread includes means for monitoring a frequency of the third thread detecting an asynchronism exceeding the predetermined tolerance and includes means for transmitting a control packet across the network to the slave data source to cause the slave data source to omit selected slave media data blocks from transmission across the network, when the frequency exceeds a predetermined threshold, the control packet including: a frame drop number, indicating the number of slave media data blocks to drop at the slave data source at a given instance; an interval count, indicating the number of slave media data blocks to allow to pass before attempting to drop more slave media data blocks; and a skip count, indicating the number of times to repeat dropping frames according to the frame drop number and the interval count.

8. The apparatus of claim 7 wherein the fifth thread comprises:

means for dropping slave media data blocks from being processed, if the third thread detects that the asynchronism exceeds the predetermined tolerance;

a data structure for recording information;

means for storing information in the data structure indicating the number of slave media data blocks dropped by the means for dropping and the time when the slave media blocks were dropped; and wherein the means for monitoring a frequency includes means for analyzing the data structure to determine the frequency.

9. The apparatus of claim 7 including means for transmitting a second control packet if the means for monitoring detects that the frequency exceeds a second predetermined threshold.

10. A computer program product for use with a computer, the program product comprising:

a computer usable medium having computer readable program code means embodied in said medium for causing the computer to synchronize a slave media stream a master media stream, the slave media stream having a plurality of slave media data blocks sequentially transmitted from a slave data source to a data target, the master media stream having a plurality of master media data blocks sequentially transmitted from a master data source to the data target, the slave media blocks and the master media blocks being transmitted across a computer network, the program code comprising:

first computer program means for causing the computer to receive the plurality of slave media data blocks and the plurality of master media data blocks at the data target;

second computer program means for comparing stream times of the slave media data blocks and the master media data blocks to determine a timing difference between the slave media stream and the master media stream; and third computer program means for causing the computer to control the slave data source to omit selected slave media data blocks from transmission across the computer network when the timing difference exceeds a predetermined threshold by transmitting a control packet across the network to cause the slave data source to omit slave media data blocks from transmission across the network, and transmitting a second control packet across the network when the timing difference exceeds a second predetermined threshold.

11. The computer program product as defined in claim 10 wherein the predetermined threshold is defined in terms of a predetermined number of frames being dropped at the data target within a predetermined time period and wherein the program code means further comprises:

fourth computer program means for causing the computer to drop slave media data blocks at the data target when the timing difference exceeds a predetermined temporal asynchronism.

* * * * *